United States Patent
Senba et al.

(10) Patent No.: US 10,807,470 B2
(45) Date of Patent: Oct. 20, 2020

(54) ELECTRIC WHEELCHAIR OPERATION APPARATUS AND VEHICLE OPERATION METHOD THEREFOR

(71) Applicant: TOYOTA JIDOSHA KABUSHIKI KAISHA, Toyota-shi, Aichi-ken (JP)

(72) Inventors: Yoshiyuki Senba, Toyota (JP); Yusuke Kosaka, Chofu (JP); Takashi Izuo, Toyota (JP)

(73) Assignee: TOYOTA JIDOSHA KABUSHIKI KAISHA, Toyota-shi, Aichi-ken (JP)

( * ) Notice: Subject to any disclaimer, the term of this patent is extended or adjusted under 35 U.S.C. 154(b) by 136 days.

(21) Appl. No.: 15/954,822

(22) Filed: Apr. 17, 2018

(65) Prior Publication Data
US 2018/0339589 A1    Nov. 29, 2018

(30) Foreign Application Priority Data
May 29, 2017 (JP) ................................. 2017-105817

(51) Int. Cl.
*A61G 5/04* (2013.01)
*B60K 26/02* (2006.01)
(Continued)

(52) U.S. Cl.
CPC .............. *B60K 26/02* (2013.01); *A61G 5/045* (2013.01); *A61G 5/10* (2013.01); *A61G 5/1051* (2016.11);
(Continued)

(58) Field of Classification Search
CPC ...... A61G 5/045; A61G 5/10; A61G 2203/10; A61G 2203/36; A61G 2203/42
See application file for complete search history.

(56) References Cited

U.S. PATENT DOCUMENTS 3,566,986 A * 3/1971 Udden .................. A61G 5/045
                                                    180/21
6,059,660 A * 5/2000 Takada .................. G05G 9/047
                                                    273/148 B
(Continued)

FOREIGN PATENT DOCUMENTS

CN    102378703 A    3/2012
CN    103690319 A    4/2014
(Continued)

OTHER PUBLICATIONS

Communication dated Dec. 11, 2018, from the European Patent Office in counterpart European Application No. 18195523.8.

*Primary Examiner* — Anne Marie M Boehler
*Assistant Examiner* — Michael R Stabley
(74) *Attorney, Agent, or Firm* — Sughrue Mion, PLLC

(57) ABSTRACT

An electric wheelchair operation apparatus includes a sliding part disposed in an armrest part, a dial part disposed on a tip side of the armrest part, the dial part configured to be moved together with the sliding part in the vehicle forward/backward direction, and an electric wheelchair drive control unit configured to control a traveling motion of an electric wheelchair by associating the amount of movement of the sliding part and/or the moved position thereof with respect to the reference point in the vehicle forward/backward direction detected by a first sensor with a traveling motion of the electric wheelchair in a forward/backward direction and associating the amount of rotation, the rotational position, and/or the rotational torque of the dial part detected by a second sensor with a turning motion of the electric wheelchair in a left/right direction.

2 Claims, 12 Drawing Sheets

(51) Int. Cl.
*A61G 5/12* (2006.01)
*A61G 5/10* (2006.01)

(52) U.S. Cl.
CPC ............ *A61G 5/125* (2016.11); *A61G 5/1054* (2016.11); *A61G 2203/10* (2013.01); *A61G 2203/14* (2013.01); *A61G 2203/36* (2013.01); *A61G 2203/38* (2013.01); *A61G 2203/42* (2013.01); *B60K 2026/025* (2013.01)

(56) References Cited

U.S. PATENT DOCUMENTS

| | | | | |
|---|---|---|---|---|
| 6,553,271 | B1 * | 4/2003 | Morrell | B60L 15/2009 700/75 |
| 6,571,892 | B2 | 6/2003 | Kamen | A61G 5/061 180/21 |
| 6,992,602 | B2 * | 1/2006 | Alexander | G05G 9/047 318/560 |
| 7,130,702 | B2 * | 10/2006 | Morrell | B60L 15/2009 700/75 |
| 7,492,353 | B2 * | 2/2009 | Ushimaru | G05G 9/047 200/6 A |
| 8,016,060 | B2 * | 9/2011 | Miki | B60L 15/20 180/65.1 |
| 8,162,328 | B2 * | 4/2012 | Horiguchi | B60G 21/007 180/218 |
| 8,271,185 | B2 * | 9/2012 | Doi | B60L 15/2036 180/165 |
| 8,301,354 | B2 * | 10/2012 | Doi | B62K 5/10 135/65 |
| 8,350,345 | B2 * | 1/2013 | Vaganov | G06F 3/0338 257/415 |
| 8,374,774 | B2 * | 2/2013 | Doi | B60L 15/20 180/218 |
| 8,423,274 | B2 * | 4/2013 | Doi | B60N 2/0244 180/218 |
| 8,436,814 | B2 * | 5/2013 | Hisatsugu | G06F 3/0338 345/156 |
| 8,442,753 | B2 * | 5/2013 | Doi | B62K 11/007 701/124 |
| 8,565,982 | B2 * | 10/2013 | Lofstrand | A61G 5/04 280/35 |
| 8,589,059 | B2 * | 11/2013 | Doi | B60L 15/20 701/1 |
| 8,845,102 | B2 * | 9/2014 | Inoue | A61B 3/0075 351/208 |
| 9,173,792 | B2 * | 11/2015 | Goffer | A61G 5/12 |
| 9,393,165 | B2 * | 7/2016 | Pettigrew | B60L 15/10 |
| 9,442,492 | B2 * | 9/2016 | Kamen | A63C 17/01 |
| 2002/0190948 | A1 * | 12/2002 | Coutant | G05G 23/02 345/161 |
| 2016/0302981 | A1 * | 10/2016 | Halsall | A61G 5/1089 |
| 2017/0371833 | A1 | 12/2017 | Boulanaache | |

FOREIGN PATENT DOCUMENTS

| | | |
|---|---|---|
| DE | 10309621 A1 | 9/2004 |
| JP | 2001-354155 A | 12/2001 |
| JP | 2011-059934 A | 3/2011 |
| JP | 2013-226227 A | 11/2013 |
| WO | 2010/113439 A1 | 10/2010 |
| WO | WO 2010/113439 * | 10/2010 |
| WO | 2016/097777 A1 | 6/2016 |

* cited by examiner

ELECTRIC WHEELCHAIR OPERATION APPARATUS AND VEHICLE OPERATION METHOD THEREFOR

CROSS REFERENCE TO RELATED APPLICATIONS

This application is based upon and claims the benefit of priority from Japanese patent application No. 2017-105817, filed on May 29, 2017, the disclosure of which is incorporated herein in its entirety by reference.

BACKGROUND

The present disclosure relates to an electric wheelchair operation apparatus for operating an electric wheelchair and its vehicle operation method.

An electric wheelchair operation apparatus that is configured so that when a user tilts a control lever in a forward/backward direction, an electric wheelchair moves in the forward/backward direction, and when the user tilts the control lever in a left/right direction the electric wheelchair turns left or right has been known (Japanese Unexamined Patent Application Publication No. 2013-226227).

The present inventors have found the following problem. When a user operates the above-described control lever, he/she needs to perform a pronate motion or a supinate motion of his/her wrist and motions of his/her fingers in a coordinated manner. Therefore, for example, when the user operates the control lever for a long time, a burden for the operation (hereinafter referred to as an operation burden) on the user increases.

SUMMARY

The present disclosure has been made to solve the above-described problem and a main object thereof is to provide an electric wheelchair operation apparatus and its vehicle operation method capable of reducing an operation burden on a user.

To achieve the above-described object, a first exemplary aspect is an electric wheelchair operation apparatus configured to operate an electric wheelchair so that the electric wheelchair performs a forward/backward movement and a turning motion, including:

an armrest part extending in a vehicle forward/backward direction, the armrest part being configured so that a user can put his/her forearm thereon;

a sliding part disposed in the armrest part, the sliding part being disposed so that it can be moved relative to the armrest part in the vehicle forward/backward direction;

a dial part disposed on a tip side of the armrest part, the dial part being disposed so that it can be moved together with the sliding part relative to the armrest part in the vehicle forward/backward direction and configured so that the user can grasp and rotate the dial part;

a first sensor configured to detect an amount of movement of the sliding part and/or a position thereof with respect to a reference point in the vehicle forward/backward direction;

a second sensor configured to detect an amount of rotation, a rotational position, and/or a rotational torque of the dial part; and an electric wheelchair drive control unit configured to control a traveling motion of the electric wheelchair by associating the amount of movement of the sliding part and/or the moved position thereof with respect to the reference point in the vehicle forward/backward direction detected by the first sensor with a traveling motion of the electric wheelchair in a forward/backward direction and associating the amount of rotation, the rotational position, and/or the rotational torque of the dial part detected by the second sensor with a turning motion of the electric wheelchair in a left/right direction.

To achieve the above-described object, another exemplary aspect may be an electric wheelchair operation apparatus configured to operate an electric wheelchair so that the electric wheelchair performs a forward/backward movement and a turning motion, including:

an armrest part extending in a vehicle forward/backward direction, the armrest part being configured so that a user can put his/her forearm thereon;

a shaft part disposed on a tip side of the armrest part in such a manner that the shaft part can be moved in at least one of the vehicle forward/backward direction and a vehicle up/down direction;

a dial part disposed in a tip of the shaft part and configured so that the user can grasp and rotate the dial part;

a third sensor configured to detect an amount of inclination, an amount of movement, a position with respect to a reference point, an inclinational torque, and/or a moving force of the shaft part;

a second sensor configured to detect an amount of rotation, a rotational position, and/or a rotational torque of the dial part; and an electric wheelchair drive control unit configured to control a traveling motion of the electric wheelchair by associating the amount of inclination, the amount of movement, the position with respect to the reference point, the inclinational torque, and/or the moving force of the shaft part detected by the third sensor with a traveling motion of the electric wheelchair in a forward/backward direction and associating the amount of rotation, the rotational position, and/or the rotational torque of the dial part detected by the second sensor with a turning motion of the electric wheelchair in a left/right direction.

In these aspects, a rotation axis of the dial part may be inclined from a vertical axis toward an outer side of the user by a predetermined angle.

To achieve the above-described object, another exemplary aspect may be a vehicle operation method for an electric wheelchair operation apparatus, the electric wheelchair operation apparatus including:

an armrest part extending in a vehicle forward/backward direction, the armrest part being configured so that a user can put his/her forearm thereon;

a sliding part disposed in the armrest part, the sliding part being disposed so that it can be moved relative to the armrest part in the vehicle forward/backward direction; and a dial part disposed on a tip side of the armrest part, the dial part being disposed so that it can be moved together with the sliding part relative to the armrest part in the vehicle forward/backward direction and configured so that the user can grasp and rotate the dial part, the vehicle operation method including:

a step of detecting an amount of movement of the sliding part and/or a position thereof with respect to a reference point in the vehicle forward/backward direction;

a step of detecting an amount of rotation, a rotational position, and/or a rotational torque of the dial part; and a step of controlling a traveling motion of an electric wheelchair by associating the detected amount of movement of the sliding part and/or the moved position thereof with respect to the reference point in the vehicle forward/backward direction with a traveling motion of the electric wheelchair in a forward/backward direction and associating the detected amount of rotation, the rotational position, and/or the rotational torque of the dial part with a turning motion of the electric wheelchair in a left/right direction.

To achieve the above-described object, another exemplary aspect may be a vehicle operation method for an electric wheelchair operation apparatus, the electric wheelchair operation apparatus including:

an armrest part extending in a vehicle forward/backward direction, the armrest part being configured so that a user can put his/her forearm thereon;

a shaft part disposed on a tip side of the armrest part in such a manner that the shaft part can be moved in at least one of the vehicle forward/backward direction and a vehicle up/down direction; and a dial part disposed in a tip of the shaft part and configured so that the user can grasp and rotate the dial part, the vehicle operation method including:

a step of detecting an amount of inclination, an amount of movement, a position with respect to a reference point, an inclinational torque, and/or a moving force of the shaft part;

a step of detecting an amount of rotation, a rotational position, and/or a rotational torque of the dial part; and a step of controlling a traveling motion of an electric wheelchair by associating the detected amount of inclination, the amount of movement, the position with respect to the reference point, the inclinational torque, and/or the moving force of the shaft part with a traveling motion of the electric wheelchair in a forward/backward direction and associating the detected amount of rotation, the rotational position, and/or the rotational torque of the dial part with a turning motion of the electric wheelchair in a left/right direction.

According to the present disclosure, it is possible to provide an electric wheelchair operation apparatus and its vehicle operation method capable of reducing an operation burden on a user.

The above and other objects, features and advantages of the present disclosure will become more fully understood from the detailed description given hereinbelow and the accompanying drawings which are given by way of illustration only, and thus are not to be considered as limiting the present disclosure.

DESCRIPTION OF EMBODIMENTS

First Embodiment

Embodiments according to the present disclosure are explained hereinafter with reference to the drawings.

An electric wheelchair operation apparatus according to a first embodiment of the present disclosure is installed in an electric wheelchair and operates the electric wheelchair so that it performs a forward/backward movement and a turning motion.

Figure 1A:
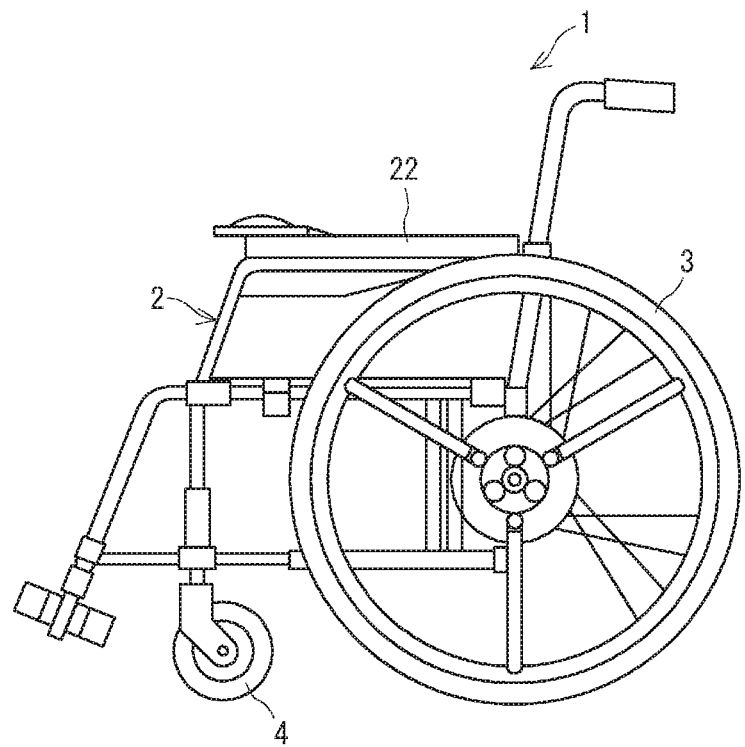
FIG. 1A is a side view showing a schematic configuration of an electric wheelchair according to a first embodiment of the present disclosure.
Figure 1B:
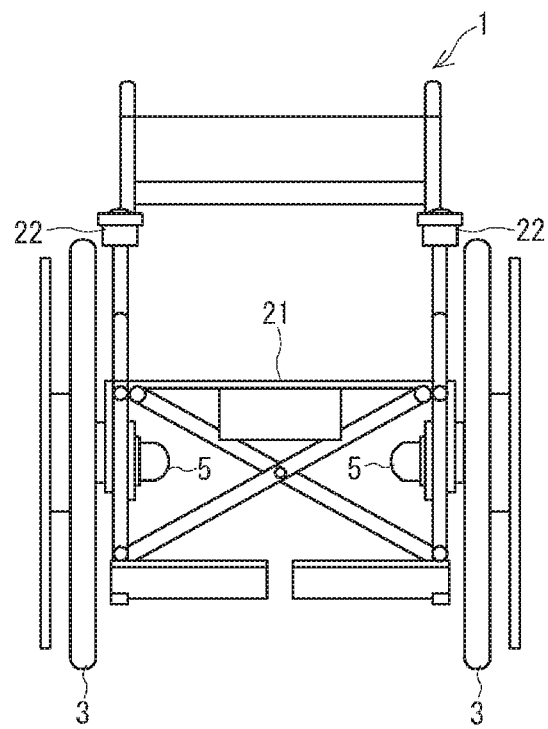
FIG. 1B is a front view showing the schematic configuration of the electric wheelchair according to the first embodiment of the present disclosure.

FIGS. 1A and 1B are a side view and a front view, respectively, showing a schematic configuration of the electric wheelchair according to the first embodiment. The electric wheelchair 1 includes a wheelchair main body 2, and a pair of left and right driving wheels 3 and follower wheels 4 mounted to the wheelchair main body 2.

The wheelchair main body 2 includes a seat part 21 on which a user sits, and armrest parts 22 extending in a vehicle forward/backward direction, on which the user puts his/her forearms.

It should be noted that when a user operates an electric wheelchair by using an ordinary control lever, he/she needs to perform a pronate motion and a supinate motion of his/her wrist and motions of his/her fingers in a coordinated manner. In general, when a person performs a pronate or supinate motion of his/her wrist, he/she uses muscles such as a quadrate pronator muscle, a round pronator muscle, a biceps muscle, and so on. Therefore, such motions make the user considerably fatigued and make delicate operations very difficult to perform.

As a result, for example, when the user operates the control lever for a long time, an operation burden on the user increases. Further, when the user performs pronate and supinate motions of his/her wrist and motions of his/her fingers in a coordinated manner, it is very difficult for him/her to perform a delicate lever operation.

To cope with this problem, in the electric wheelchair operation apparatus according to the first embodiment, a user can move the electric wheelchair 1 in a forward/backward direction by moving his/her forearm in the forward/backward direction and make the electric wheelchair 1 turn left or right by performing radial flection or ulnar flection of his/her wrist and a rotational motion using five fingers. Since the user efficiently operates the electric wheelchair operation apparatus by the operation performed by his/her arm and the operation performed by his/her wrist and fingers in a divided manner as described above, it is unnecessary to perform the pronate and supinate motions of the wrist and the motions of the fingers in the coordinated manner involving a large operation burden. Consequently, the operation burden on the user can be significantly reduced. Further, since it is unnecessary to perform the pronate and supinate motions of the wrist and the motions of the fingers in the coordinated manner, the user can easily perform delicate operations for the electric wheelchair 1.

Figure 2:
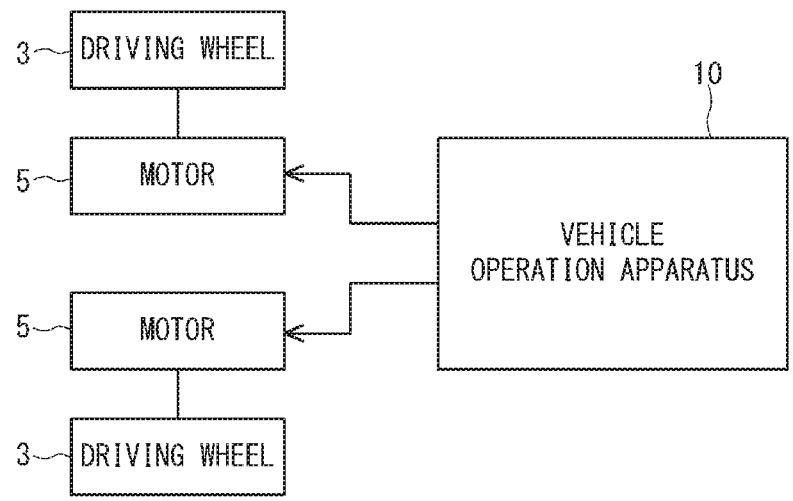
FIG. 2 is a block diagram showing a schematic system configuration of the electric wheelchair according to the first embodiment of the present disclosure.

FIG. 2 is a block diagram showing a schematic system configuration of the electric wheelchair according to the first embodiment.

The electric wheelchair 1 includes a pair of motors 5 that drive the pair of the driving wheels 3, and an electric wheelchair operation apparatus 10 that operates (i.e., enables a user to operate) the electric wheelchair 1 by controlling each of the motors 5.

Figure 3:
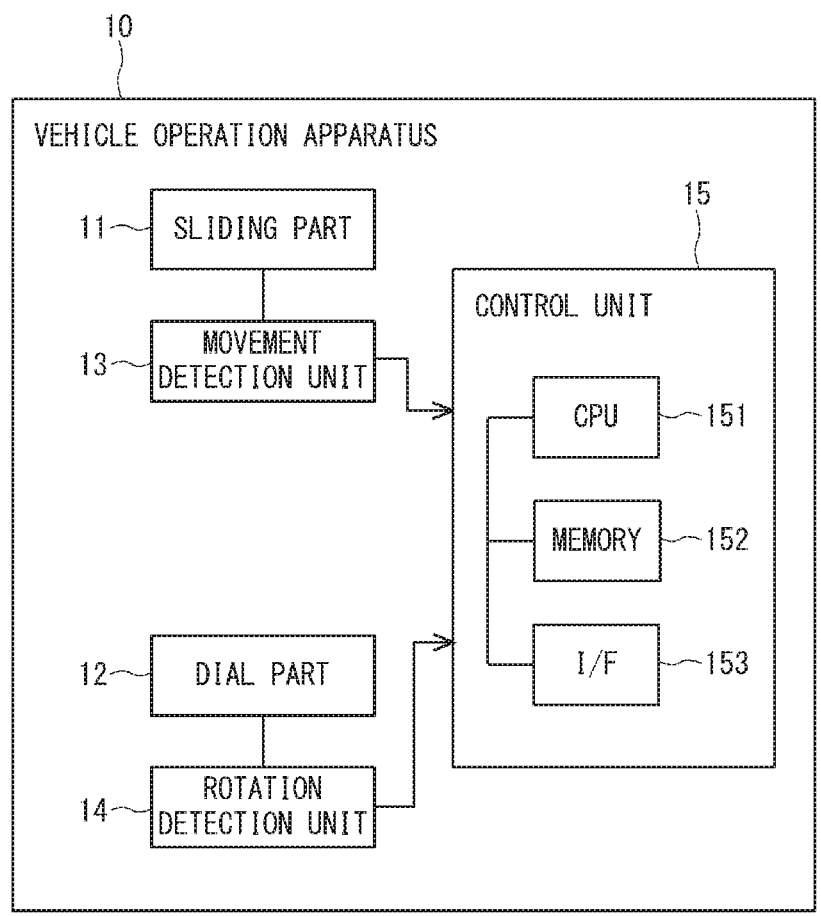
FIG. 3 is a block diagram showing a schematic system configuration of an electric wheelchair operation apparatus according to the first embodiment of the present disclosure.

FIG. 3 is a block diagram showing a schematic system configuration of the electric wheelchair operation apparatus according to the first embodiment. The electric wheelchair operation apparatus 10 according to the first embodiment includes a sliding part 11 disposed in the armrest part 22 in such a manner that the sliding part 11 can be moved relative to the armrest part 22 in the vehicle forward/backward direction, a dial part 12 that a user can grasp and rotate, a first sensor 13 that detects a movement of the sliding part 11 in the vehicle forward/backward direction, a second sensor 14 that detects a rotation of the dial part 12, and an electric wheelchair drive control unit 15 that controls a movement of the electric wheelchair 1 in the forward/backward direction and a turning motion of the electric wheelchair 1 in the left/right direction.

Figure 4A:
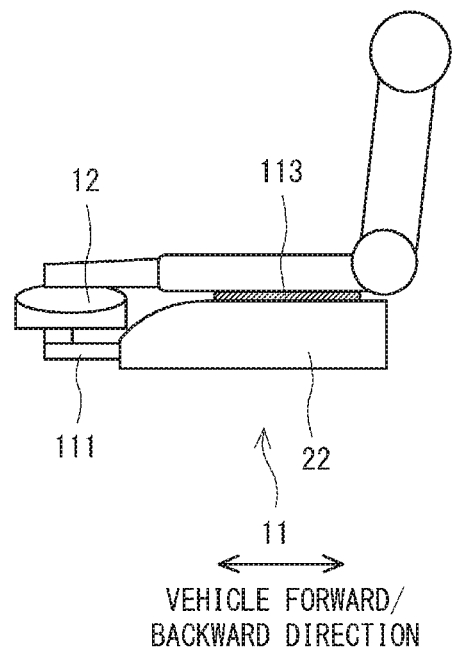
FIG. 4A is a side view showing an armrest part and a sliding part.
Figure 4B:
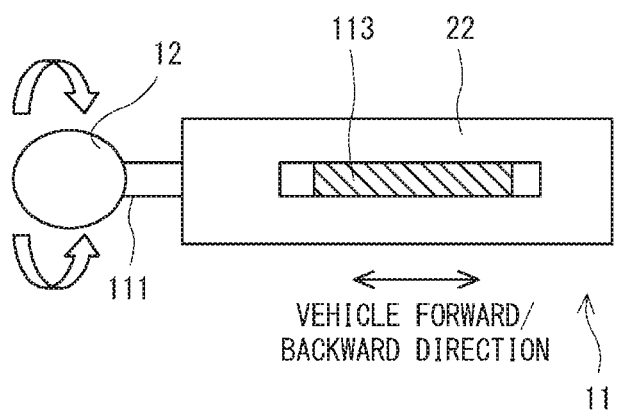
FIG. 4B is a top view showing the armrest part and the sliding part.

FIGS. 4A and 4B are a side view and a top view, respectively, showing the armrest part and the sliding part. The sliding part 11 is provided to move (i.e., enable a user to move) the electric wheelchair 1 in the vehicle forward/backward direction. The sliding part 11 is disposed inside the armrest part 22. A user puts his/her forearm on the sliding part 11 and moves the sliding part 11 in a straight line relative to the armrest part 22 in the vehicle forward/backward direction.

Figure 5:
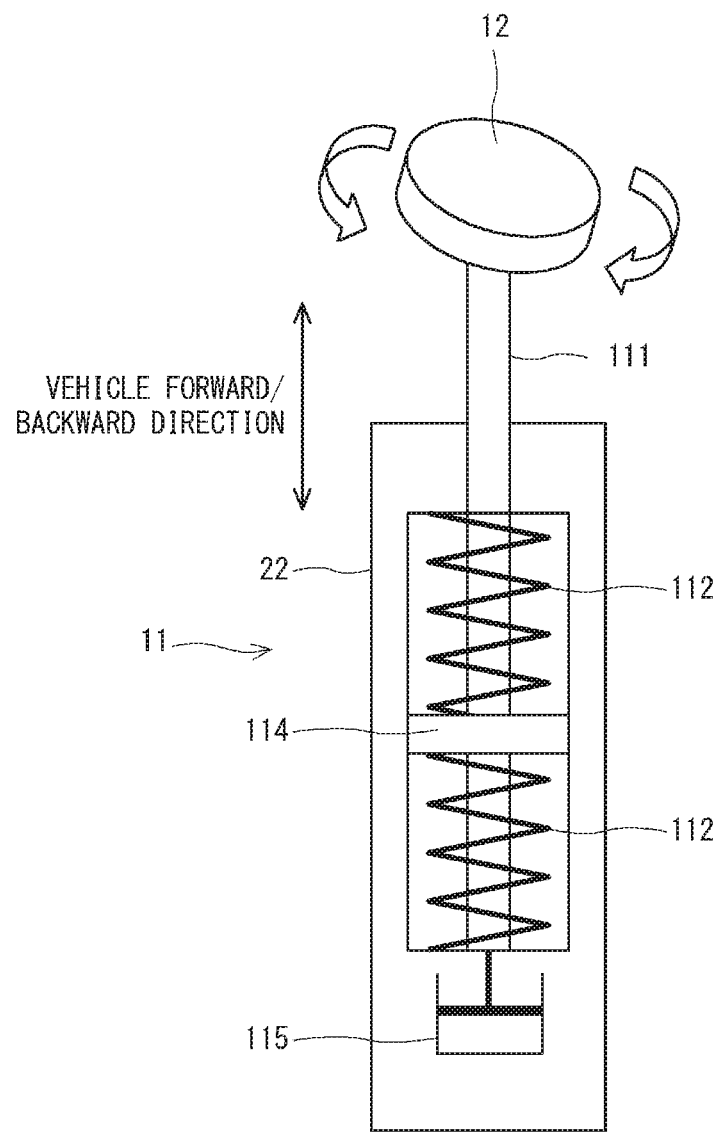
FIG. 5 shows a configuration of the sliding part.

FIG. 5 shows a configuration of the sliding part. The sliding part 11 includes a sliding bar 111 disposed inside the armrest part 22, a pair of springs 112 that urges (i.e., presses) the sliding bar 111, and a contact part 113 (FIGS. 4A and 4B) that is connected to the sliding bar 111 and comes into contact with the user's forearm.

The pair of springs 112 supports the sliding bar 111 in a neutral position in such a manner that the springs 112 sandwich a middle part 114 of the sliding bar 111 therebetween. When the user slides his/her forearm forward, the sliding bar 111 of the sliding part 11 moves forward from the neutral position because of the sliding of the forearm. The spring 112 disposed on the front side is compressed and its elastic force increases the load for the sliding bar 111, making the forward movement of the sliding bar 111 more difficult. Conversely, when the user slides his/her forearm backward, the sliding bar 111 of the sliding part 11 moves backward from the neutral position. The spring 112 disposed on the rear side is compressed and its elastic force increases the load for the sliding bar 111, making the backward movement of the sliding bar 111 more difficult.

As described above, the sliding bar 111 is configured so that the farther the sliding bar 111 moves from the neutral position, the larger the load against the sliding bar 111 becomes, making the movement of the sliding bar 111 more difficult. In this way, it is possible to prevent the sliding part 11 from being abruptly operated and thereby prevent the electric wheelchair 1 from performing a sudden movement, thus improving the safety of the electric wheelchair 1. Further, when the user relaxes his/her forearm, the sliding bar 111 of the sliding part 11 automatically returns to the neutral position. Therefore, the user can easily return the sliding bar 111 of the sliding part 11 to the neutral position, thus eventually reducing the operation burden on the user.

A damper 115 may be provided at a tip of the sliding bar 111. This damper 115 further prevents the sliding bar 111 from being abruptly operated. Therefore, it is possible to prevent the sliding part 11 from being abruptly operated and thereby prevent the electric wheelchair 1 from performing a sudden movement more reliably.

Figure 6:
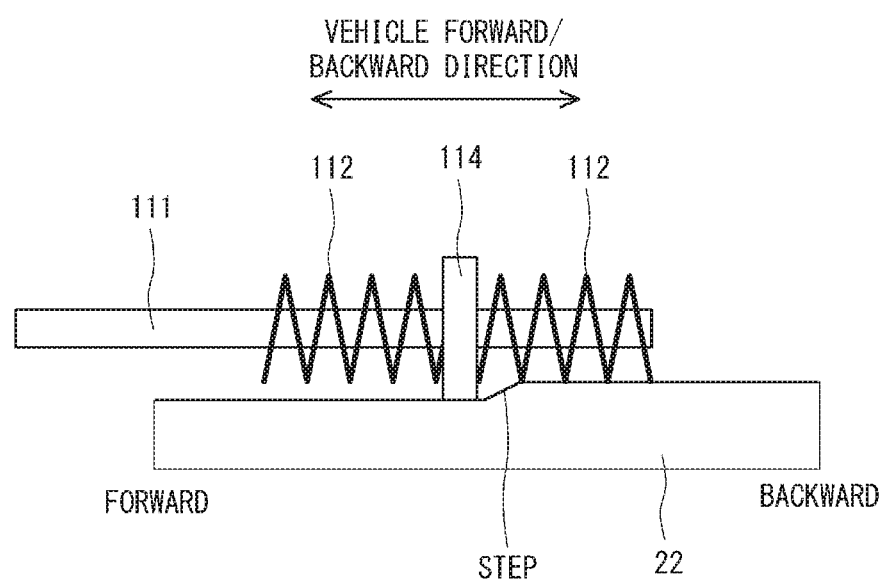
FIG. 6 shows a configuration in which a step is formed on a sliding surface of the armrest part.

The middle part 114 of the sliding bar 111 moves in the vehicle forward/backward direction along a sliding surface of the armrest part 22. As shown in FIG. 6, the armrest part 22 may be configured so that a step is formed at the neutral position of the sliding bar 111 on the sliding surface.

The sliding surface has a cam-shape in which the height of the forward side with respect to the step is low and the height of the backward side with respect to the step is high. Therefore, when the middle part 114 of the sliding bar 111 passes the step and enters the backward side, the sliding bar 111 and the contact part 113 are raised and hence the user's forearm is raised. When the middle part 114 of the sliding bar 111 is present on the backward side with respect to the step, i.e., on the backward side with respect to the neutral position, the electric wheelchair 1 is in a backward moving state (which will be explained later). Therefore, the user can easily recognize that the electric wheelchair 1 is in the backward moving state because his/her forearm is raised.

The dial part 12 is provided to make (i.e., enable the user to make) the electric wheelchair 1 turn left or right. As shown in FIGS. 4A and 4B, the dial part 12 is disposed on a tip side of the armrest part 22 and moves together with the sliding part 11 in a straight line relative to the armrest part 22 in the vehicle forward/backward direction. The dial part 12 is connected to a tip part of the sliding bar 111 of the sliding part 11. By this configuration, even when the user moves his/her forearm relative to the armrest part 22 in the vehicle forward/backward direction and thereby moves the sliding part 11 in the vehicle forward/backward direction, a relative positional relation between the forearm and the dial part 12 does not change. Therefore, the operability of the dial part 12 does not change, thus enabling stable operations.

The dial part 12 is formed in a roughly disk-like shape so that a user can easily grasp it. The user can grasp the dial part 12 and rotate it in a clockwise direction (a right direction) and a counterclockwise direction (a left direction). The left/right direction in the above-described rotational operation is defined so that a load that is imposed when a human being (i.e., the user) rotates his/her wrist is minimized.

Note that when a user puts his/her forearm on the armrest part 22, the forearm is twisted toward the outer side of the user (i.e., toward the little-finger side) in a natural state. Therefore, to conform the dial part 12 to this twist of the forearm, the rotation axis of the dial part 12 is inclined from the vertical axis toward the outer side of the user by a predetermined angle (about 0 to 90 degrees).

In this way, the user can grasp and operate the dial part 12 in a natural posture (e.g., a relaxed posture) without forcibly twisting his/her forearm. Consequently, the operation burden on the user can be reduced. Further, by disposing the dial part 12 in the inclined state, the user can clearly recognize the rotation direction of the dial part 12 and its viewability improves. As a result, the user can make the electric wheelchair 1 perform a turning motion more precisely.

Figure 7:
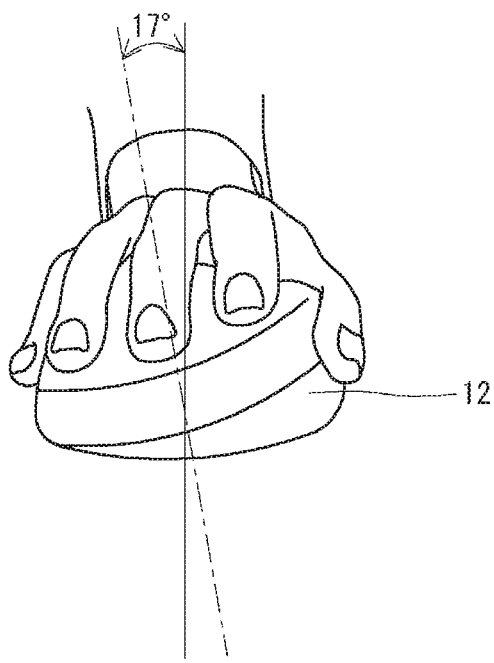
FIG. 7 shows an example of a predetermined angle.

For example, as shown in FIG. 7, the predetermined angle is set to about 17 degrees (around 15 degrees). The predetermined angle of the dial part 12 can be adjusted as desired according to the twisted state of the user's forearm. In this way, each individual user can operate the electric wheelchair 1 in an operating posture optimal for that user.

Figure 8:
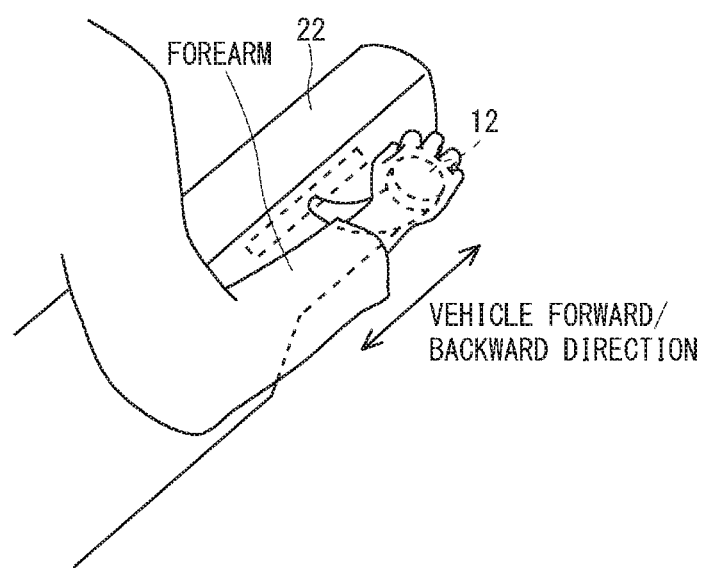
FIG. 8 shows a configuration in which a dial part relatively moves in a straight line in a vehicle forward/backward direction.
Figure 9:
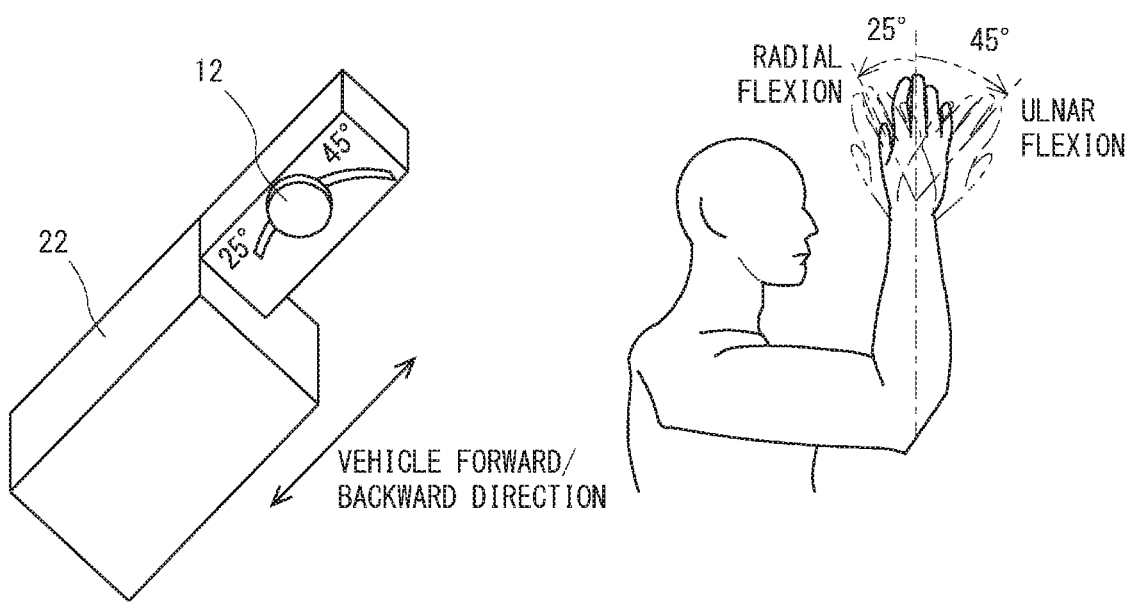
FIG. 9 shows a configuration in which a dial part relatively moves in the vehicle forward/backward direction in an arc pattern.

As shown in FIG. 8, for example, the dial part 12 may be configured so that it moves together with the sliding part 11 in a straight line relative to the armrest part 22 in the vehicle forward/backward direction. However, the configuration of the dial part 12 is not limited to this example. For example, as shown in FIG. 9, the dial part 12 may be configured so that it moves relative to the armrest part 22 in the vehicle forward/backward direction in an arc pattern.

This arc trajectory (i.e., the arc pattern) is defined based on, for example, a rotatable range in which a human being (i.e., the user) can perform radial flection (about 25°) and ulnar flection (about 45°) of his/her wrist. In this way, the user can relatively move the dial part 12 in the vehicle forward/backward direction by performing only the radial and ulnar flection in which the operation burden on the user is small. Consequently, the operation burden on the user can be reduced.

Figure 10A:
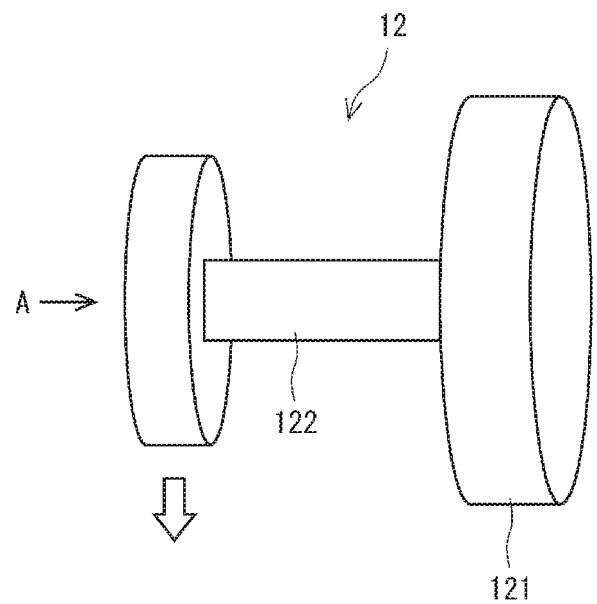
FIG. 10A is a perspective view showing a configuration of a dial part.
Figure 10B:
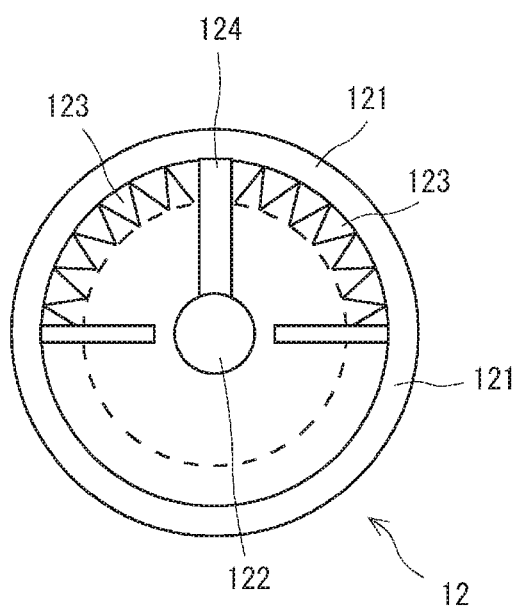
FIG. 10B is a partial perspective view when the dial part shown in FIG. 10A is viewed in a direction A.

As shown in FIGS. 10A and 10B, the dial part 12 includes, for example, a grasping part 121 that the user grasps and a support part 122 that is housed inside the armrest part 22 and rotatably supports the grasping part 121.

A pair of springs 123 supports the grasping part 121 in a neutral position in such a manner that the springs 123 sandwich a middle part 124 of the support part 122 therebetween. When the user rotates the grasping part 121, one of the springs 123 is compressed and its elastic force increases the load for the grasping part 121. As described above, the grasping part 121 is configured so that the more the grasping part 121 is rotated from the neutral position, the larger the load against the grasping part 121 becomes, making the rotation of the grasping part 121 more difficult. In this way, it is possible to prevent the dial part 12 from being abruptly operated and thereby prevent the electric wheelchair 1 from performing a sudden movement, thus improving the safety of the electric wheelchair 1.

Note that the electric wheelchair 1 may be sometimes moved so that, for example, its armrest parts 22 are moved into space under a desk or the like. In such a case, some space needs to be present above the armrest parts 22 (i.e., between the desk and the armrest parts 22). To cope with such a situation, the sliding part 11 and the dial part 12 are configured so that their heights (i.e., their tops) do not exceed the height (i.e., the top) of the armrest part 22 in the electric wheelchair operation apparatus 10 according to the first embodiment. Further, the user puts his/her forearm on the armrest part 22 and operates the sliding part 11 in the forward/backward direction or the dial part 12 in the left/right direction in the above-described height range. Therefore, only small space corresponding to the height of the user's forearm put on the armrest part 22 is needs to be secured. Therefore, for example, the user can smoothly move the electric wheelchair 1 deep into the space under the desk.

The first sensor 13 detects an amount of movement of the sliding bar 111 of the sliding part 11 in the vehicle forward/backward direction and a direction of the movement. The first sensor 13 is disposed in, for example, the sliding bar 111 of the sliding part 11. The first sensor 13 is constructed by using a contact linear position sensor, a Hall IC contactless stroke sensor, a magnetostrictive linear sensor, or the like.

For example, when the first sensor 13 is constructed by using a magnetostrictive linear sensor, a magnet is provided inside the sliding bar 111. The first sensor 13 outputs the amount of movement of the sliding bar 111 of the sliding part 11 in the vehicle forward/backward direction and the direction of the movement to the electric wheelchair drive control unit 15.

The second sensor 14 detects an amount of rotation of the dial part 12 and a direction of the rotation. The second sensor 14 is disposed in the dial part 12. The second sensor 14 is constructed by using, for example, a contact rotary encoder or a contactless rotary encoder (such as a Hall IC rotation angle sensor, an optical rotary encoder, a magnetic rotary encoder, or an electromagnetic-coupling rotary encoder). The second sensor 14 outputs the detected amount of rotation and the rotation direction of the dial part 12 to the electric wheelchair drive control unit 15.

A traveling motion of the electric wheelchair 1 is controlled by associating the amount of movement of the sliding part in the vehicle forward/backward direction and/or a moved position thereof with respect to a reference point detected by the first sensor 13 with a traveling motion of the electric wheelchair 1 in the forward/backward direction. For example, the electric wheelchair drive control unit 15 controls the movement of the electric wheelchair 1 in the forward/backward direction based on the amount of movement of the sliding part 11 in the vehicle forward/backward direction and the direction of the movement detected by the first sensor 13.

Note that the electric wheelchair drive control unit 15 may be formed by, for example, hardware mainly using a microcomputer including a CPU (Central Processing Unit) 151 that performs control processing, arithmetic processing, and so on, a memory 152 including a ROM (Read Only Memory) and/or a RAM (Random Access Memory) that stores a control program, an arithmetic program, and so on to be executed by the CPU 151, and an interface unit (I/F) 153 that externally receives and outputs signals. The CPU 151, the memory 152, and the interface unit 153 are connected with each other through a data bus or the like.

The electric wheelchair drive control unit 15 controls each of the motors 5 and moves the electric wheelchair 1 forward based on a movement of the sliding part 11 in a vehicle forward direction detected by the first sensor 13. The electric wheelchair drive control unit 15 controls each of the motors 5 and moves the electric wheelchair 1 backward based on a movement of the sliding part 11 in a vehicle backward direction detected by the first sensor 13. Further, the electric wheelchair drive control unit 15 controls each of the motors 5 in such a manner that the larger the amount of movement of the sliding part 11 in the vehicle forward/backward direction detected by the first sensor 13 is, the more the moving speed of the electric wheelchair 1 in the forward/backward direction is increased.

A traveling motion of the electric wheelchair 1 is controlled by associating the amount of rotation, a rotational position, and/or a rotational torque of the dial part 12 detected by the second sensor 14 with a turning motion of the electric wheelchair 1 in the left/right direction. For example, the electric wheelchair drive control unit 15 controls the turning motion of the electric wheelchair 1 based on the amount of rotation and the direction thereof of the dial part 12 detected by the second sensor 14.

The electric wheelchair drive control unit 15 controls each of the motors 5 and makes the electric wheelchair 1 turn right based on a rotation of the dial part 12 in a right direction (i.e., a clockwise direction) detected by the second sensor 14. The electric wheelchair drive control unit 15 controls each of the motors 5 and makes the electric wheelchair 1 turn left based on a rotation of the dial part 12 in a left direction (i.e., a counterclockwise direction) detected by the second sensor 14. The electric wheelchair drive control unit 15 controls each of the motors 5 in such a manner that the larger the amount of rotation of the dial part 12 in the left/right direction detected by the second sensor 14 is, the more the turning speed of the electric wheelchair 1 in the left/right direction is increased.

The second sensor 14 may be a torque sensor that detects a rotational torque and a rotation direction of the dial part 12. In such a case, the dial part 12 may be configured so that it is barely rotatable. The torque sensor is, for example, three-axis haptic sensor. The second sensor 14 outputs the detected rotational torque and the rotation direction of the dial part 12 to the electric wheelchair drive control unit 15. The electric wheelchair drive control unit 15 controls the turning motion of the electric wheelchair 1 based on the rotational torque and the rotation direction of the dial part 12 detected by the second sensor 14. The electric wheelchair drive control unit 15 controls each of the motors 5 in such a manner that the larger the rotational torque of the dial part 12 in the left/right direction detected by the second sensor 14 is, the more the turning speed of the electric wheelchair 1 in the left/right direction is increased.

As described above, the user moves the electric wheelchair 1 in the vehicle forward/backward direction by relatively moving his/her forearm in the vehicle forward/backward direction and thereby moving the sliding part 11 in the vehicle forward/backward direction. Further, the user makes the electric wheelchair 1 turn left or right by rotating the dial part 12 in the left/right direction. As described above, the electric wheelchair operation apparatus 10 according to the first embodiment is configured so that it operates the electric wheelchair 1 while definitely separating the operation of the electric wheelchair 1 in the vehicle forward/backward direction and the turning operation thereof in the left/right direction from each other. Therefore, the user can clearly recognize the direction of the operation and thereby prevent an operation mistake.

Figure 11:
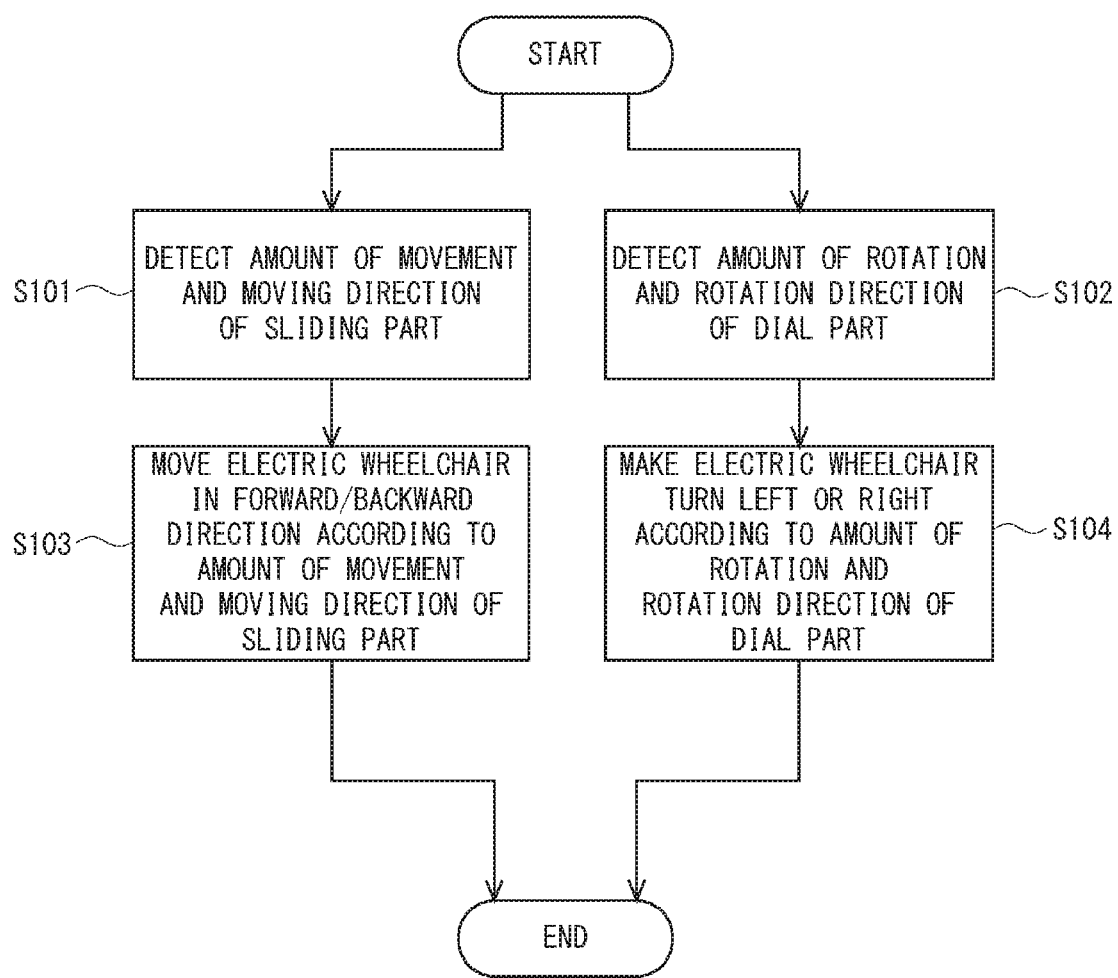
FIG. 11 is a flowchart showing a flow of a vehicle operation method in an electric wheelchair operation apparatus according to the first embodiment of the present disclosure.

FIG. 11 is a flowchart showing a flow of a vehicle operation method in the electric wheelchair operation apparatus according to the first embodiment. The process flow shown in FIG. 11 may be, for example, repeatedly performed at predetermined time intervals.

When a user moves the sliding bar 111 of the sliding part 11 in the vehicle forward/backward direction, the first sensor 13 detects an amount of movement of the sliding bar 111 of the sliding part 11 in the vehicle forward/backward direction and a direction of the movement and outputs the detected amount of movement and the moving direction of the sliding part 11 to the electric wheelchair drive control unit 15 (step S101).

When the user rotates the dial part 12 in the left/right direction, the second sensor 14 detects an amount of rotation and a rotation direction of the dial part 12 and outputs the detected amount of rotation and the rotation direction of the dial part 12 to the electric wheelchair drive control unit 15 (step S102).

The electric wheelchair drive control unit 15 controls each of the motors 5 and moves the electric wheelchair 1 in the forward/backward direction based on the movement of the sliding part 11 in the vehicle forward/backward direction and the direction of the movement detected by the first sensor 13 (step S103).

The electric wheelchair drive control unit 15 controls each of the motors 5 and makes the electric wheelchair 1 turn left or right based on the amount of rotation and the rotation direction of the dial part 12 detected by the second sensor 14 (step S104). The above-described (step S101) and (step S103) may be performed simultaneously with and in parallel with the (step S102) and (step S104), respectively.

As described above, an electric wheelchair operation apparatus 10 according to the first embodiment includes: a sliding part 11 disposed in an armrest part 22 so that the sliding part 11 can be moved relative to the armrest part 22 in a vehicle forward/backward direction; a dial part 12 disposed on a tip side of the armrest part 22, the dial part 12 being disposed so that it can be moved together with the sliding part 11 relative to the armrest part 22 in the vehicle forward/backward direction and configured so that a user can grasp and rotate the dial part 12; a first sensor 13 configured to detect a movement of the sliding part 11 in the vehicle forward/backward direction; a second sensor 14 configured to detect a rotation of the dial part 12; and an electric wheelchair drive control unit 15 configured to control a traveling motion of an electric wheelchair 1 by associating an amount of movement of the sliding part 11 and/or a moved position thereof with respect to a reference point in the vehicle forward/backward direction detected by the first sensor 13 with a traveling motion of the electric wheelchair 1 in a forward/backward direction and associating an amount of rotation, a rotational position, and/or a rotational torque of the dial part 12 detected by the second sensor 14 with a turning motion of the electric wheelchair 1 in a left/right direction.

The user can move the electric wheelchair 1 in the forward/backward direction by moving his/her forearm in the forward/backward direction and makes the electric wheelchair 1 turn left or right by performing radial flection or ulnar flection of his/her wrist and a rotational motion using five fingers. Therefore, it is unnecessary to perform the pronate and supinate motions of the wrist and the motions of the fingers in the coordinated manner involving a large operation burden. Consequently, the operation burden on the user can be significantly reduced.

Second Embodiment

Figure 12:
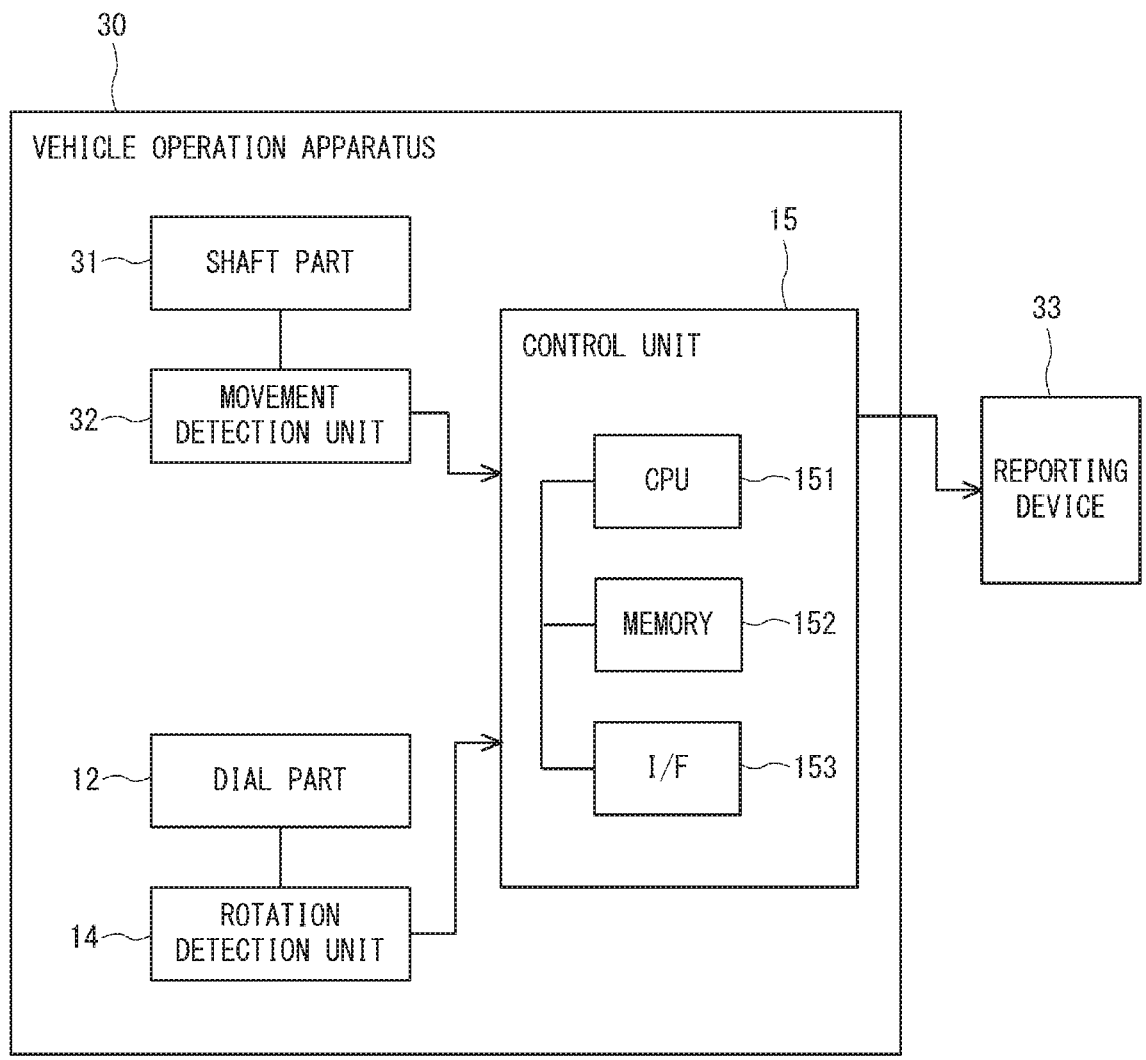
FIG. 12 is a block diagram showing a schematic system configuration of an electric wheelchair operation apparatus according to a second embodiment of the present disclosure.

FIG. 12 is a block diagram showing a schematic system configuration of an electric wheelchair operation apparatus according to a second embodiment of the present disclosure. The electric wheelchair operation apparatus 30 according to the second embodiment includes a shaft part 31 disposed on a tip side of an armrest part 22 in such a manner that the shaft part 31 can be inclined in a vehicle forward/backward direction, a dial part 12 that a user can grasp and rotate, a third sensor 32 that detects an inclination of the shaft part 31 in the vehicle forward/backward direction, a second sensor 14 that detects a rotation of the dial part 12, and an electric wheelchair drive control unit 15 that controls the movement of the electric wheelchair 1 in the forward/backward direction and a turning motion of the electric wheelchair 1 in the left/right direction.

In the electric wheelchair operation apparatus 30 according to the second embodiment, a user can move the electric wheelchair 1 in the forward/backward direction by tiling the shaft part 31 in the forward/backward direction and make the electric wheelchair 1 turn left or right by rotating the dial part 12 in the left/right direction. Therefore, since it is unnecessary to perform the pronate and supinate motions of the wrist and the motions of the fingers in the coordinated manner involving a large operation burden, the operation burden on the user can be significantly reduced.

Figure 13:
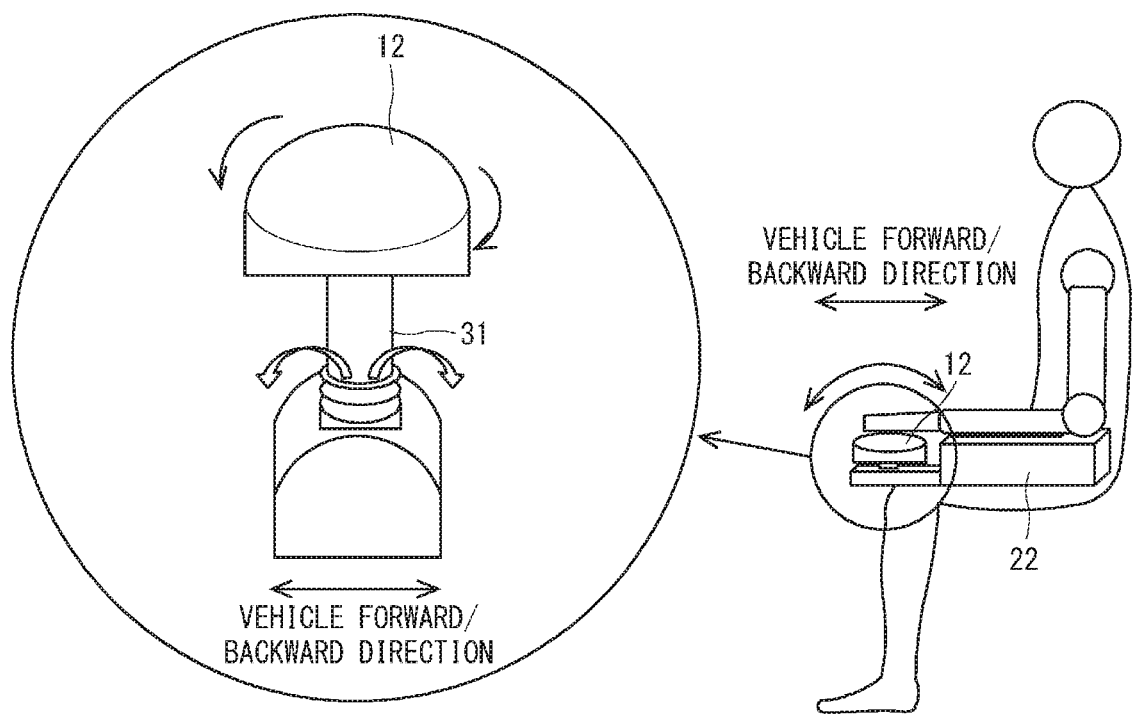
FIG. 13 shows a shaft part and a sliding part.

FIG. 13 shows the shaft part and the sliding part. The shaft part 31 is provided to move (i.e., enable a user to move) the electric wheelchair 1 in the vehicle forward/backward direction. The shaft part 31 is connected to the tip of the armrest part 22 through a tilting mechanism or the like and is disposed in a standing position in the vertical direction. The length of the shaft part 31 is adjustable. By adjusting the length of this shaft part 31, the user can adjust the height of the dial part 12 so that the user can easily manipulate it.

The shaft part 31 is in a neutral state when it is positioned in the vertical direction. Further, the shaft part 31 can be tilted forward and backward from the neutral state. A clicking feeling is given to the user when the position of the shaft part 31 is changed from a forward-inclined position to a backward-inclined position, or from the backward-inclined position to the forward-inclined position. As a result, the user can sense and recognize a switching between the forward and backward directions. Further, the shaft part 31 is configured so that when a user stops applying a forward/backward force to the shaft part 31, it returns to the neutral position by a restoring force of a spring or the like.

The dial part 12 is provided to make (i.e., enable a user to make) the electric wheelchair 1 turn left or right. The dial part 12 is disposed in a tip of the shaft part 31 in such a manner that the dial part 12 can be rotated. The dial part 12 is formed in a roughly disk-like shape and the user can grasp the dial part 12 and rotate it in the left/right direction.

To conform the dial part 12 to a twist of user's forearm, the rotation axis of the dial part 12 is inclined from the vertical axis toward the outer side by a predetermined angle. In this way, the user can grasp and operate the dial part 12 in a natural posture (e.g., a relaxed posture) without forcibly twisting his/her forearm.

The third sensor 32 detects an inclination of the shaft part 31 in the vehicle forward/backward direction. The third sensor 32 detects an amount of inclination (i.e., an inclination angle) of the shaft part 31 and an inclination direction thereof. The third sensor 32 is disposed in the shaft part 31. The third sensor 32 is constructed by using, for example, an angle sensor. The third sensor 32 outputs the detected amount of inclination and the inclination direction of the shaft part 31 to the electric wheelchair drive control unit 15.

The second sensor 14 detects an amount of rotation of the dial part 12 and a direction of the rotation. The second sensor 14 is disposed in the dial part 12. The second sensor 14 outputs the detected amount of rotation and the detected rotation direction of the dial part 12 to the electric wheelchair drive control unit 15.

A traveling motion of the electric wheelchair 1 is controlled by associating the amount of inclination of the shaft part 31 detected by the third sensor 32 with a traveling motion of the electric wheelchair 1 in the forward/backward direction. For example, the electric wheelchair drive control unit 15 controls the movement of the electric wheelchair 1 in the forward/backward direction based on the amount of inclination of the shaft part 31 and the inclination direction thereof detected by the third sensor 32.

The electric wheelchair drive control unit 15 controls each of the motors 5 and moves the electric wheelchair 1 forward based on an inclination of the shaft part 31 in a vehicle forward direction detected by the third sensor 32. The electric wheelchair drive control unit 15 controls each of the motors 5 and moves the electric wheelchair 1 backward based on an inclination of the shaft part 31 in a vehicle backward direction detected by the third sensor 32. Further, the electric wheelchair drive control unit 15 controls each of the motors 5 in such a manner that the larger the amount of inclination of the shaft part 31 in the vehicle forward/backward direction detected by the third sensor 32 is, the more the moving speed of the electric wheelchair 1 in the forward/backward direction is increased.

A traveling motion of the electric wheelchair 1 is controlled by associating the amount of rotation and/or a rotational position of the dial part 12 detected by the second sensor 14 with a turning motion of the electric wheelchair 1 in the left/right direction. For example, the electric wheelchair drive control unit 15 controls the turning motion of the electric wheelchair 1 based on the amount of rotation and the direction thereof of the dial part 12 detected by the second sensor 14. The electric wheelchair drive control unit 15 controls each of the motors 5 and makes the electric wheelchair 1 turn right based on a rotation of the dial part 12 in a right direction detected by the second sensor 14. The electric wheelchair drive control unit 15 controls each of the motors 5 and makes the electric wheelchair 1 turn left based on a rotation of the dial part 12 in a left direction detected by the second sensor 14. The electric wheelchair drive control unit 15 controls each of the motors 5 in such a manner that the larger the amount of rotation of the dial part 12 in the left/right direction detected by the second sensor 14 is, the more the turning speed of the electric wheelchair 1 in the left/right direction is increased.

The third sensor 32 may be a torque sensor that detects an inclinational torque and a direction thereof of the shaft part 31. In such a case, the shaft part 31 may be configured so that it is barely inclinable. The torque sensor is, for example, three-axis haptic sensor. The third sensor 32 outputs the detected inclinational torque and the direction thereof of the shaft part 31 to the electric wheelchair drive control unit 15. The electric wheelchair drive control unit 15 controls each of the motors 5 and thereby controls the movement of the electric wheelchair 1 in the forward/backward direction based on the inclinational torque and the direction thereof of the shaft part 31 detected by the third sensor 32. The electric wheelchair drive control unit 15 controls each of the motors 5 in such a manner that the larger the inclinational torque of the shaft part 31 detected by the third sensor 32 is, the more the moving speed of the electric wheelchair 1 in the forward/backward direction is increased.

Similarly, the second sensor 14 may be a torque sensor that detects a rotational torque and a rotation direction of the dial part 12. The second sensor 14 outputs the detected rotational torque and the rotation direction of the dial part 12 to the electric wheelchair drive control unit 15. The electric wheelchair drive control unit 15 controls the turning motion of the electric wheelchair 1 based on the rotational torque and the rotation direction of the dial part 12 detected by the second sensor 14. The electric wheelchair drive control unit 15 controls each of the motors 5 in such a manner that the larger the rotational torque of the dial part 12 in the left/right direction detected by the second sensor 14 is, the more the turning speed of the electric wheelchair 1 in the left/right direction is increased.

When the electric wheelchair 1 is moving backward (or starts moving backward), the electric wheelchair drive control unit 15 may report the backward moving state to a user by using a reporting device 33. In this way, the user can clearly recognize the backward movement of the electric wheelchair 1 and hence the safety is improved. The reporting device 33 is, for example, a vibration device that vibrates a part that comes into contact with a user, such as the seat part 21 or the armrest part 22, a light that is turned on (or flushed on and off) as a warning light, a speaker that outputs an alarm, or the like. Further, when the electric wheelchair drive control unit 15 detects an obstacle around the electric wheelchair 1, the electric wheelchair drive control unit 15 may report the detection of the obstacle to the user by using the reporting device 33.

Third Embodiment

Figure 14:
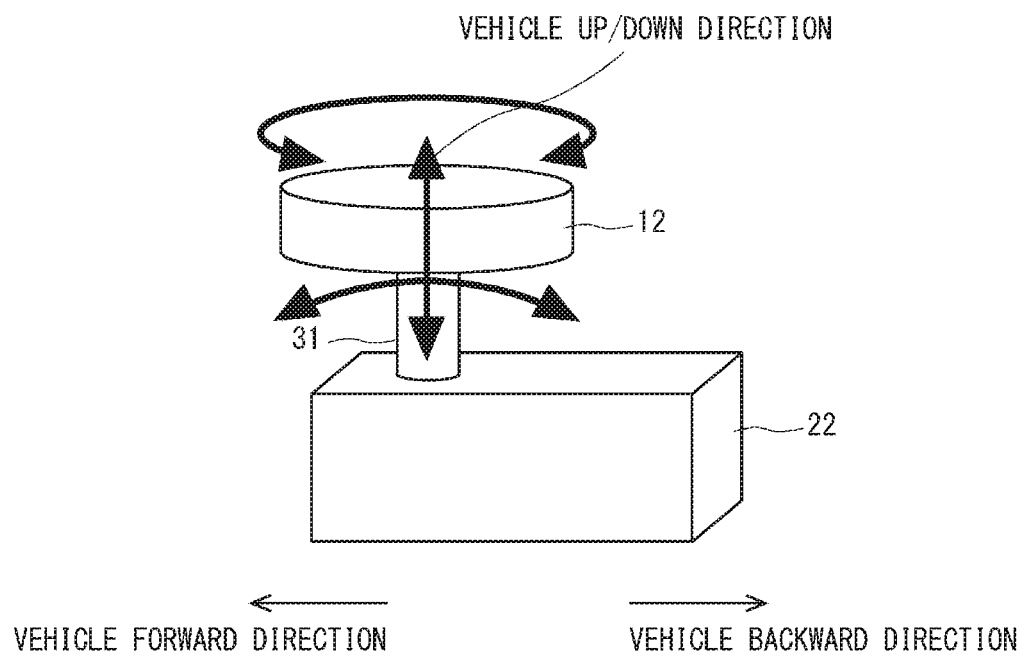
FIG. 14 is a perspective view showing a schematic configuration of an electric wheelchair operation apparatus according to a third embodiment.

An electric wheelchair operation apparatus 30 according to a third embodiment of the present disclosure moves an electric wheelchair 1 in a forward/backward direction according to a movement of a shaft part 31 in a vehicle up/down direction. The shaft part 31 is disposed on a tip side of an armrest part 22 in such a manner that the shaft part 31 can be moved in the vehicle up/down direction (FIG. 14).

Figure 15:
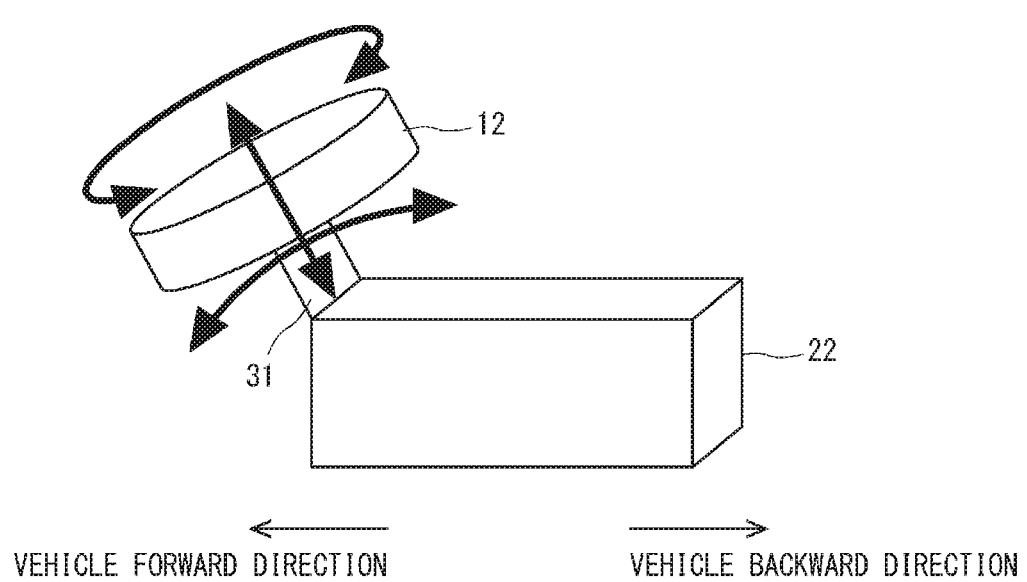
FIG. 15 shows an example of a configuration in which a shaft part is in a neutral position and inclined in a forward/backward direction.

Note that although the shaft part 31 is orientated in the vertical direction in the neutral position, the shaft part 31 may be inclined in the forward/backward direction in the neutral position (FIG. 15). The inclination angle of this shaft part 31 may be adjustable according to an operating posture of a user. In this way, the user can operate the dial part 12 in a more optimal posture.

A third sensor 32 detects a movement of the shaft part 31 in the vehicle up/down direction. The third sensor 32 detects an amount of movement of the shaft part 31 in the vehicle up/down direction and a direction of the movement. The third sensor 32 outputs the detected amount of movement of the shaft part 31 in the vehicle up/down direction and the direction of the movement to the electric wheelchair drive control unit 15. The electric wheelchair drive control unit 15 controls the movement of the electric wheelchair 1 in the forward/backward direction based on the amount of movement of the shaft part 31 in the vehicle up/down direction and the direction of the movement detected by the third sensor 32.

The electric wheelchair drive control unit 15 controls each of the motors 5 and moves the electric wheelchair 1 forward based on a movement of the shaft part 31 in a vehicle downward direction detected by the third sensor 32. The electric wheelchair drive control unit 15 controls each of the motors 5 and moves the electric wheelchair 1 backward based on a movement of the shaft part 31 in a vehicle upward direction detected by the third sensor 32. The electric wheelchair drive control unit 15 controls each of the motors 5 in such a manner that the larger the amount of movement of the shaft part 31 in the vehicle up/down detected by the third sensor 32 is, the more the moving speed of the electric wheelchair 1 in the forward/backward direction is increased. Note that the electric wheelchair drive control unit 15 may move the electric wheelchair 1 backward based on a movement of the shaft part 31 in the vehicle downward direction, and move the electric wheelchair 1 forward based on a movement of the shaft part 31 in the vehicle upward direction.

The electric wheelchair drive control unit 15 controls the turning motion of the electric wheelchair 1 based on the amount of rotation and the direction thereof of the dial part 12 detected by the second sensor 14.

In the electric wheelchair operation apparatus 30 according to the third embodiment, a user can move the electric wheelchair 1 in the forward/backward direction by moving the shaft part 31 in the up/down direction and make the electric wheelchair 1 turn left or right by rotating the dial part 12 in the left/right direction. Therefore, since it is unnecessary to perform the pronate and supinate motions of the wrist and the motions of the fingers in the coordinated manner involving a large operation burden, the operation burden on the user can be significantly reduced.

Note the third sensor 32 may be a haptic sensor that detects a magnitude of a moving force of the shaft part 31 in the vehicle up/down direction and a direction of the moving force. In such a case, the shaft part 31 may be configured so that it is barely movable in the vehicle up/down direction. The third sensor 32 outputs the detected magnitude of the moving force of the shaft part 31 in the vehicle up/down direction and the direction thereof to the electric wheelchair drive control unit 15.

The electric wheelchair drive control unit 15 controls each of the motors 5 and thereby controls the movement of the electric wheelchair 1 in the forward/backward direction based on the magnitude of the moving force of the shaft part 31 in the vehicle up/down direction and the direction thereof detected by the third sensor 32. The electric wheelchair drive control unit 15 controls each of the motors 5 in such a manner that the larger the moving force of the shaft part 31 detected by the third sensor 32 is, the more the moving speed of the electric wheelchair 1 in the forward/backward direction is increased.

Further, the electric wheelchair drive control unit 15 controls each of the motors 5 and thereby controls the movement of the electric wheelchair 1 in the forward/backward direction based on the movement of the shaft part 31 in the vehicle up/down direction and the inclination of the shaft part 31 in the vehicle forward/backward direction detected by the third sensor 32. For example, the electric wheelchair drive control unit 15 may move the electric wheelchair 1 forward based on a movement of the shaft part 31 in the vehicle downward direction, and move the electric wheelchair 1 backward based on an inclination of the shaft part 31 in the vehicle backward direction.

In the third embodiment, the same symbols as those in the above-described first and second embodiments are assigned to the same components/structures as those in the above-described first and second embodiments, and their detailed explanations are omitted.

Note that the present disclosure is not limited to the above-described embodiments, and various modifications can be made without departing from the spirit and scope of the present disclosure. For example, the configurations of the above-described embodiments may be combined with one another in an arbitrary manner.

From the present disclosure thus described, it will be obvious that the embodiments of the present disclosure may be varied in many ways. Such variations are not to be regarded as a departure from the spirit and scope of the present disclosure, and all such modifications as would be obvious to one skilled in the art are intended for inclusion within the scope of the following claims.

What is claimed is:

1. An electric wheelchair operation apparatus configured to operate an electric wheelchair so that the electric wheelchair performs a forward/backward movement and a turning motion, comprising:
- an armrest part extending in a vehicle forward/backward direction, the armrest part being configured so that a user can put his/her firearm thereon;
- a sliding part disposed in the armrest part, that slides relative to the armrest part in the vehicle forward/backward direction;
- a dial part disposed on a tip side of the armrest part, the dial part being disposed so that it can be moved together with the sliding part relative to the armrest part in the vehicle forward/backward direction and configured so that the user can grasp and rotate the dial part;
- a first sensor configured to detect an amount of movement of the sliding part and/or a position thereof with respect to a reference point in the vehicle forward/backward direction;
- a second sensor configured to detect an amount of rotation, a rotational position, and/or a rotational torque of the dial part; and
- an electric wheelchair drive control unit configured to control a traveling motion of the electric wheelchair by associating the amount of movement of the sliding part and/or the moved position thereof with respect to the reference point in the vehicle forward/backward direction detected by the first sensor with a traveling motion of the electric wheelchair in a forward/backward direction and associating the amount of rotation, the rotational position, and/or the rotational torque of the dial part detected by the second sensor with a turning motion of the electric wheelchair in a left/right direction,
- wherein a rotation axis of the dial part is inclined from a vertical axis toward an outer side of the user by a predetermined angle.

2. An electric wheelchair operation apparatus configured to operate an electric wheelchair so that the electric wheelchair performs a forward/backward movement and a turning motion, comprising:
- an armrest part extending in a vehicle forward/backward direction, the armrest part being configured so that a user can put his/her forearm thereon;
- a tilting mechanism;
- a shaft part connected to a tip of the armrest part through the tilting mechanism so as to be movable in the vehicle forward/backward direction;
- a dial part disposed in a tip of the shaft part and configured so that the user can grasp and rotate the dial part;
- a third sensor comprising one of an angle sensor configured to detect an amount of inclination and an inclination direction of the shaft part and a torque sensor configured to detect an inclinational torque and a direction thereof of the shaft part;
- a second sensor configured to detect an amount of rotation, a rotational position, and/or a rotational torque of the dial part; and
- an electric wheelchair drive control unit configured to control a traveling motion of the electric wheelchair by associating the amount of inclination and inclination direction or the inclinational torque and direction thereof of the shaft part detected by the third sensor with a traveling motion of the electric wheelchair in a forward/backward direction and by associating only the amount of rotation, the rotational position, and/or the rotational torque of the dial part detected by the second sensor with a turning motion of the electric wheelchair in a left/right direction,
- wherein a rotation axis of the dial part is inclined from a vertical axis toward an outer side of the user by a predetermined angle.

\* \* \* \* \*